United States Patent [19]
Hoppe

[11] 3,899,728
[45] Aug. 12, 1975

[54] APPARATUS FOR MAINTAINING HIGH PRECISION IN A ROTATING DEVICE USED WITH OPTICAL APPARATUS

[75] Inventor: Walter Hoppe, Munich, Germany

[73] Assignee: Max-Planck-Gesellschaft ZUR Forderung der Wissenshaften e.V., Gottingen, Germany

[22] Filed: July 12, 1973

[21] Appl. No.: 378,421

[30] Foreign Application Priority Data
July 21, 1972 Germany.......................... 2236529

[52] U.S. Cl. ................ 318/687; 318/662; 310/8.3; 356/156
[51] Int. Cl. ...................... G05b 11/00; G05b 1/06
[58] Field of Search ............. 310/8.3; 318/118, 662, 318/687; 356/156

[56] References Cited
UNITED STATES PATENTS

| | | | |
|---|---|---|---|
| 2,866,146 | 12/1958 | Rodrigues, Jr. ................. | 318/662 X |
| 3,429,155 | 2/1969 | Hines ............................. | 318/687 X |
| 3,501,683 | 3/1970 | Webb .............................. | 318/687 |
| 3,569,718 | 3/1971 | Borner ........................... | 318/118 X |
| 3,684,904 | 8/1972 | Galutva et al. ................. | 318/118 X |

OTHER PUBLICATIONS

Grant et al., "Closed–Loop Head Positioning Apparatus," pp. 3183, 3184, IBM Tech. Disc. Bull., Vol. 15, March 1973.

*Primary Examiner*—T. E. Lynch
*Attorney, Agent, or Firm*—Kenyon & Kenyon Reilly Carr & Chapin

[57] ABSTRACT

Apparatus to maintain high precision in the location of an axis about which an object is tilted such as in an electronic microscope, in which the axis position is measured and the measurements compared with stored calibration values, and the difference between the measured and stored values used to drive positioning devices to correct for any error in axis position.

7 Claims, 8 Drawing Figures

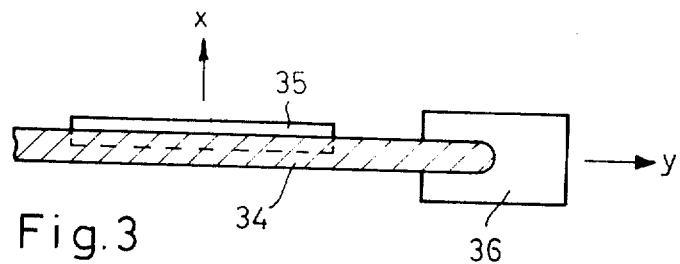
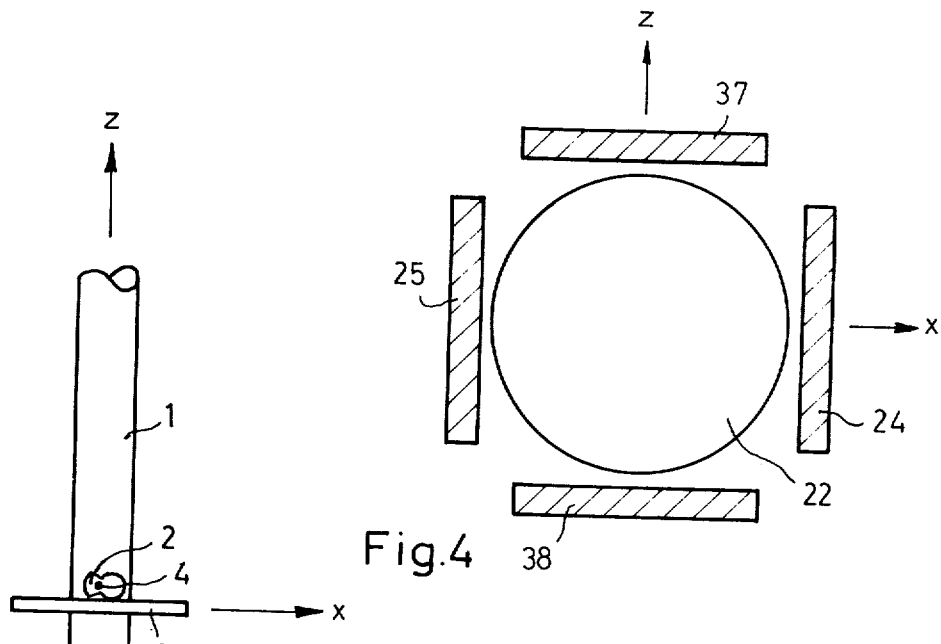
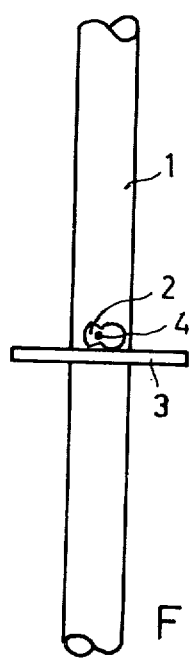
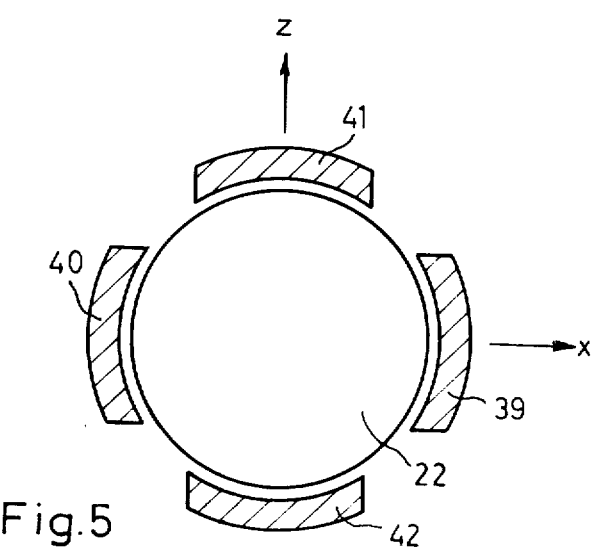

3,899,728

APPARATUS FOR MAINTAINING HIGH PRECISION IN A ROTATING DEVICE USED WITH OPTICAL APPARATUS

BACKGROUND OF THE INVENTION

This invention relates to optical apparatus of the type having a tilting device which must be rotated about an axis which is to be maintained in a precise position, and more particularly to apparatus for maintaining high precision in such a rotating device.

In making observations or measurements using an electron microscope, the specimen is often placed on a rotating or tilting device which may rotate the specimen about an axis. It is important in such cases that rotation occur about a fixed point and accuracies in the order of a few angstroms are required. Tolerances of this nature cannot be obtained with conventional mechanical bearing. At best using such bearings, precision in the order of fractions of microns are possible. When the tilting device and such an optical system is rotated, the tilting axis follows an irregular path. This requires readjustment of the specimen stage for each different angular rotation, particularly when the specimen is being observed with high magnification.

Precise rotation or bearing accuracy is also required in other types of optical systems using light and/or x-rays. In such cases, the accuracy required in the electron microscope, i.e., a few angstroms may not be required. However, there may be a requirement of bearing precision of, for example, 0.1 microns. The best ball bearings presently available can only maintain accuracies of several microns.

Thus, for use in both electron microscopes and in other types of optical systems there is a need for maintaining accuracies beyond that presently obtainable with ball bearings.

SUMMARY OF THE INVENTION

The present invention provides a means of maintaining the types of accuracies described above. To accomplish this, distance measuring devices are used to measure the shaft position. These devices are fixed with respect to a nominal shaft position and as the shaft wobbles as it rotates, measure the change in distance between the shaft and the fixed device. The distance measurements so obtained are then used to control a displacement drive to reposition the bearings in which the shaft is located to thereby reposition the axis and maintain it at a point fixed in space to a high degree of accuracy.

Any available bearings may be used in the present invention, along with the apparatus to be described below, and the system adapted to the particular problem or type of bearing which is involved. The intrinsic precision of the bearing is matched to the ultimate desired accuracy of the rotating device. Thus, to obtain the highest possible accuracy the most accurate bearing available will be used as a starting point. For purposes of the present disclosure, bearings should be understood to include not only conventional bearings, in which motion exists between different parts such as a sleeve and a shaft, but also to include devices in which elastic deformation takes place. Examples of such devices are torsion rods, ribbon suspensions, or support arrangements consisting of several different tension ribbons. In the sense of the present invention, all of these devices comprise bearings.

The solution of the present invention is not in reducing the mechanical bearing in accuracy, but in compensating for these inaccuracies using a distance measuring device associated with the shaft of the bearing which measurements are then used to control a displacement device which is mechanically coupled to the bearing. As will be described in detail below, compensation may be provided for any and all degrees of freedom of the bearing.

BRIEF DESCRIPTION OF THE DRAWINGS

FIG. 1 is a elevation view illustrating the placement of a specimen on the stage of an electron microscope.

FIG. 3 is an elevation view illustrating an alternate sensing means for use in the present invention.

FIG. 4 illustrates a first type of capacitive distance measuring device.

FIG. 5 illustrates second capacitive distance measuring device.

DETAILED DESCRIPTION OF THE PREFERRED EMBODIMENT

Figure 2:
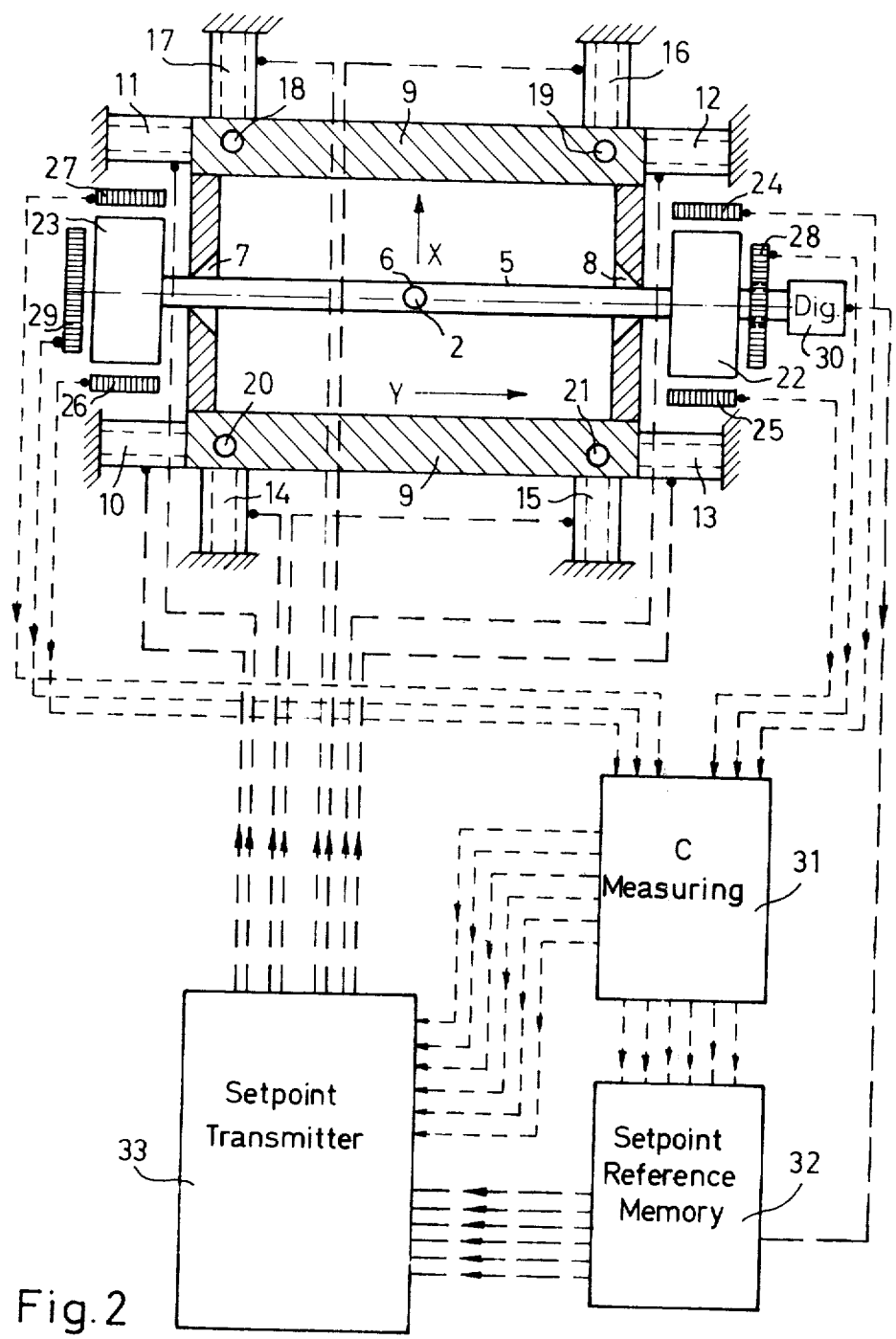
FIG. 2 is a cross sectional elevation view of an embodiment of the present invention with control elements shown in block diagram form.

FIG. 1 illustrates the arrangement at the point where an electron beam 1 intersects a specimen 2 on a carrier film 3. The electron beam which will be of a small diameter, e.g., 100 A is the primary beam in an electron defraction device such as an electron microscope. It is desired that the specimen 2 be tilted about the axis 4 perpendicular to the drawing. This permits electron defractions pictures to be taken for different tilt angles of the specimen. For this purpose, it is important that the axis of rotation remain fixed with respect to the X axis. This will insure that the same portion of the specimen is viewed at each different tilt angle. It is not particularly important that the axis of rotation remain fixed along the Z axis. A slight displacement of the specimen in the Z direction is unimportant in comparison to the defraction length. Similarly, a slight change in the orientation of the axis of rotation [tumbling error] is not significant as long as the cross section of the electron beam is small. Motion of the specimen should remain fixed in the direction of the Y axis, i.e., the axis perpendicular to the paper about which the specimen rotates to avoid it wandering out of the finely focused beam 1. Thus, it is important to keep the specimen fixed along both the X and Y axes. FIG. 2 illustrates a first embodiment of the invention. The shaft 5 is supported for rotation in bearings 7 and 8. In the center of the shaft 5 is a hole 6 in which an object carrier may be placed to hold the specimen 2. The shaft 5 will be supported by the mechanical aliding bearings 7 and 8 which will be designed to have the highest possible accuracy. Bearings 7 and 8 are arranged in a frame 9 which is movable in the X and Y directions in a manner to be described below. The ability to move in the X and Y directions need only be confined to a small amount of motion sufficient to make up for the tolerance of the bearings.

However, it is necessary that the means driving the frame 9 in the X and Y direction have a resolution capability in the order of a few angstroms. This type of movement can be achieved with some mechanical devices. However, for this application, electrostrictive or magnetostrictive drives which can be built, for example, in a well known manner using piezoceramic tubes having inside and outside electrodes, are particularly useful. In the embodiment of FIG. 2, four piezoceramic positioning members 10, 11, 12, and 13 are used to provide for displacement in the Y direction. Similarly, four positioning members 14, 15, 16 and 17 are used to obtain displacement in the X direction. Such displacement is obtained by applying voltages to the electrodes of the tubes which will result in small parallel displacements in the X or Y direction. Frame 9 may be supported for sliding motion on a base. However, since the displacements involved are extremely small, it can equally well be supported by rods having elastic deformability in the X and Y directions. Thus, on FIGS. 2 there are shown four rods, 18, 19, 20, and 21 from which the frame 9 is suspended.

On the surface it might appear that it would be sufficient to determine through calibration, the voltages required for each given angular position of the shaft 5 which are needed to be applied to the positioning members 10, 11, 12 and 13 and members 14, 15, 16, and 17 to maintain the specimen 2 in the desired position as the shaft 5 is rotated. This however, is not sufficient since the shaft wanders in a completely irregular path as it is rotated and, when returned to the same rotational position after being moved therefrom, will generally require a different correction.

To get around this problem, the displacement devices are controlled in response to a distance measuring device. In the embodiment of FIG. 2, the ends of shaft 5 have attached thereto cylindrical members 22 and 23 which are either made of a conductive material or provided with a conductive surface. These are then used to provide one plate of a capacitor. At an extremely small spacing from the cylinder, plate shaped vertically disposed electrodes 24, 25, 26, 27, 28, and 29 are provided. These plates along with the cylindrical members 23 and 22 thereby form a plurality of capacitors. Since the plate size will always remain fixed the only variable will be the distance between the plates and thus, by measuring the capacity of each of the capacitors so formed, a indication of the spacing and positioning of the shaft 5 may be obtained. The measurements so made will only be relative. This is true since the cylinders can be machined only with a finite mechanical tolerance. Even if the shaft could be positioned with absolute accuracy, the gap of the capacitors would change during rotation because of inaccuracies in the cylinder radius. However, making the assumption of absolute accuracy for the bearings, the inaccuracy in the cylinders will remain constant. Thus, for each angular position of the shaft the spacing between the electrodes 24 through 29 will be the same. Thus, for every angular position of rotation a set of capacity values may be defined. By measuring the capacities during a calibration stage, and then comparing with actual measured values, it is then possible to position the frame 9 so that for a given angular rotation the predetermined values and the measured values are equal. When this is done, the shaft 5 and the specimen carried thereon will be properly positioned.

Calibration may be accomplished by making absolute measurements of the position of the axis of rotation as it is rotated around. In an electron, defraction apparatus, such an absolute measurement is possible if the apparatus has been designed, for example, as the fine range defraction device in an electron microscope. Where means are provided to observe the object 2, through the electron microscope, its lateral displacements can be observed directly on the electron microscope picture.

Attached to the shaft 5 is a digitizer 30 which may comprise a shaft encoder and will output a digital word corresponding to the angular position of the shaft 5. Each of the capacitor plates is connected to a capacity measuring device 31. The outputs of the capacitor measuring device 31 and the output of digitizer 30 are both provided as inputs to a set point reference memory 32 in which calibration values are stored. The outputs of the capacity measuring device and the set-point reference memory 32 are provided to a set-point transmitter B which provides output signals to the electrodes of the tubes 10 through 17. During calibration, the object 2 is observed and the outputs of the set point transmitter varied until it is properly positioned. At that point, the output of digitizer 30 indicating the angular position and the capacities measured from the capacitors made up of plates 22–24, 22–25, 22–26, 22–27, 22–28 and 22–29 are stored in the set-point reference memory. This process is repeated for a number of angles with the angle and the capacities corresponding to proper positioning of the shaft 5 stored for each position. When finished, the set-point reference memory 32 will have stored therein, a plurality of angular positions and associated with each angular position the proper capacity values for the desired shaft position. In the capacity measuring device 31 a plurality of capacitance bridges or the like may be provided one for each capacitor or, alternatively, a single bridge provided along with means to sequentially measure each of the values. The former is preferable if high rates of rotation must be handled. Since it is preferable to store these values in digital form, the capacity measuring device should also include one or more analog digital converters which will convert the analog voltage corresponding to the measured capacitance into a digital value which may easily be stored in the memory 32.

Once all the values are stored, the system may be operated, the shaft 5 will be rotated to obtain the desired amount of tilt. The capacity measuring device will then measure each of the capacitances and provide them to the set-point transmitter. In response to the digitizer output indicating the shaft angle, the reference values for that particular angle will be provided as outputs from the set-point reference memory to the set-point transmitter 33. In the set-point transmitter 33 the reference values will be compared with the measured values and the error signals used to provide output voltages to the positioning members 10–11, 12–13, 14–15 and 16–17. These voltages will be varied until the measured capacitance values are equal to the stored capacitance values at which point the shaft 5 will be properly positioned.

Note the importance of storing the measured capacity values rather than storing the voltages needed to position the shaft. The voltages may vary from time to time because of the shaft wobble and thus different voltages may be required for properly positioning the shaft even when the tilt angle is the same. As described, only a finite set of shaft angles are stored, thereby indicating that only tilts of these angles may be accurately used. However, if the measurements are close enough together then tilt angles between those measured may also be used and interpolation between the measured angles performed. It should be noted however, that in many applications the limitation to a discrete set of tilt angles is sufficient.

In the embodiment of FIG. 2, capacity measurement was used to measure distances. However, it is also possible to use inductive or piezoelectric transmitter to perform this measurement. In addition, optical methods, such as light-optical interference methods or electron-optical methods may also be used. When using these latter methods, particularly the electron-optical methods, it is also possible to determine the reference and actual values by an absolute length measuring method, in which case the use of the electron microscope in the calibration can be dispensed with.

An example of the use of the electron-optical measuring arrangement is illustrated by FIG. 3. The axis of rotation is made extremely fine in the form of a whisker. The shaft axis 34 is placed in front of the two slits 35 and 36 behind each of which there is placed a detector. In front of the detector, i.e., in front of the plane of the drawing, an electron source is provided. The detectors and electron source are arranged in a fixed relation to the equipment. An electron beam which is directed normal to the plane of the drawing, will be able to pass through the slits 35 and 36 partially since both slits are partly covered by the shaft 34. A displacement of the shaft in the X direction will change the width of the slit 35 through which the electron beam may pass. However, it does not change the effective aperture of the opening 26. Thus the detector behind the slit 35 will be sensitive only to X displacement. Similarly motion of the shaft in the Y direction will have no effect on the amount of radiation which is allowed to pass through the slit 35 but will change the amount which passes through the aperture 36. Thus a detector behind the aperture 36 will effectively measure Y displacement. The accuracy of an arrangement such as this will be determined to by the accuracy of the thin shaft 35 and its cylindrical symmetry. The control range is determined by the thickness of the shaft 34. The magnitude of the control range is not particularly important if continuous compensation of the two set point values [which are to be held constant] is accomplished by means of the displacement arrangement using the piezoceramic positioning members. If due to a large error in adjusting, the shaft gets completely out of the range of the slits 35 or 36 its reappearance can be easily recognized by a significant change in the measuring signal obtained from the detectors. Although discussed in terms of an electron beam, the arrangement of FIG. 3 is also operable using visible or ultraviolet light. In this regard, it should be mentioned that the defraction phenomena 9 play a relatively minor role in this case, since gap width variations below the resolution of the radiation used still influence the intensity of the zero defraction maximum.

In the arrangements of FIGS. 2 or 3 it is important that regardless of whether relative or absolute length measurements are made, that the individual coordinates be coupled to each other. These arrangements of FIGS. 2 and 3 do not provide compensation of the Z axis which in these two Figs. is the axis perpendicular to the plane of the paper. It should be noted however, that both of these arrangements can be extended so that motion of the Z axis, i.e., the axis of rotation can also be compensated in the Z axis direction. In FIG. 2 this can simply be accomplished by replacing the supports 18 through 21 with piezoelectric positioning members and by providing additional capacitor electrodes similar to electrodes 24, 25, 26, and 27 but perpendicular thereto. In regard to FIG. 3, Z axis displacement can be measured by arranging a further slit and detector oriented at a right angle to slit 35 so as to be hit by rays which are parallel to the plane of the drawing. Such a slit should be displaced with respect to slit 35 in the Y direction to prevent mutual interference.

As noted above, the frame 9 can be supported by additional electrostrictive elements to obtain Z displacement. In that case, as is the case with the members shown in FIG. 2, the electrostrictive elements will be elastically stretched to some degree. For example, action of the displacement elements 10, 11, 12, and 13 will result in a small degree of elastic stretching of the elements 14, through 17. However, since these displacements are very small, any changes in the properties of the elements resulting therefrom can be ignored. It should also be noted that since these elements are used only for positioning and not for measuring, a change in their property will properly be compensated for if an interative process is followed in positioning the frame 9.

If coordinates of the bearing are to be compensated, independence of the set-point values of individual coordinates with respect to each other is not longer extremely important. FIGS. 4 and 5 illustrate this. FIG. 4 is an end view of the cylinder 22 of FIG. 2 showing the electrode plates 24 and 25 along with electrode plates 37 and 38 used for measurements and the Z direction. The electrode 28 has been omitted for the sake of clarity. It can be seen from this Fig. that movement of the cylinder in the X direction will increase the capacity of the capacitor 22–24 and decrease the capacity of capacitor 22–25 while leaving the capacities of the capacitors 22–37 and 22–38 unchanged. Similarly, motion in the Z direction will change the values of the capacitors associated with plates 37 and 38 while not effecting the capacities of the capacitances associated with plates 24 and 25.

FIG. 5 illustrates an arrangement in which the capacitor electrodes designated 39, 40, 41 and 42 are formed as a section of a cylinder. As with the embodiment of FIG. 4 displacement in the X direction results in an increase of the capacity value of the capacitor 39–22 and a decrease in the capacitors 40–22. Because the plates 39 and 40 are made to fit more closely to the cylinder 22 the average distance between the plates is small. This results in a larger absolute capacity being measured and also in a larger relative change of capacity for a given cylinder displacement. Thus, better performance may be obtained with this arrangement. When the cylinder is moved in the X direction, it does slightly influence the capacitors 22–41 and 22–42. This change is very much smaller than the change of the other capacitors and through an interative process will be cancelled out. Similar results are obtained with displacement in the Z direction. What this means is that a compensation in the X direction followed by a subsequent conversation in the Z direction will be somewhat in error. However, if the compensations are cyclically repeated several times the errors are eliminated.

The capacitors formed by the electrodes 29–23 and 27–23 along with the capacitor formed by 24–22 could in principle be eliminated, since they, in a sense, repeat the measurement obtained from other capacitors, i.e., those formed respectively by the electrodes 28–22, 26–22 and 25–22. However, it is advisable to keep this arrangement since if thermal expansion of the cylinder occurs the spacing can change without the position of the shaft 5 or the object 2 necessarily changing. The use of dual electrodes permits compensating partially for such influences. Preferably the reference and actual values will then be related to the ratio of the measured values from opposite set electrodes and will thus be independent of thermal dimensional changes of the cylinder. It should be noted, however, that measuring devices must be provided at least at both ends of the shaft since both bearings 7 and 8 must be compensated separately.

Figure 6:
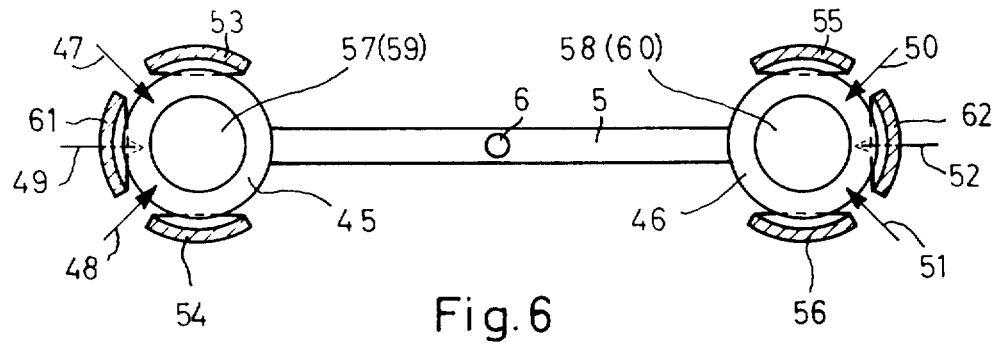
FIG. 6 illustrates an embodiment wherein a shaft is supported by spherical bearings on each end.

The cylinders 22 and 23 of FIG. 2 may be replaced by spheres as is illustrated by FIG. 6. With such an arrangement the sensitivity of measurements can be increased since spheres can be ground extremely accurately. This permits the capacitor gap to be kept very small. An additional advantage is that the spheres can also be used as the bearing element, replacing the conical bearings 7 and 8 of FIG. 2. As shown the cylinders 22 and 23 are replaced by spheres 45 and 46 which provide not only the capacitor plate but also replace the bearings 7 and 8 of FIG. 2. The cylinder 45 is supported at points 47, 48 and 49 and the cylinder 46 at points 50, 51 and 52 for rotation about an axis through the shaft 5. The three point supports will then be connected to a frame such as frame 9 of FIG. 2 which will be positioned in the manner described above. The capacitors formed by the spheres 45 and 46 and the plates arranged around them correspond exactly to the capacitors described above. Thus, the plates 53 and 54 correspond to plates 27 and 26, plates 61 and 62 to the plates 29 and 28 and plates 57 and 59 (which is behind the sphere 45) and plates 58 and 60 (which is behind the sphere 46) to the plates 37 and 38 of the FIG. 4. For purpose of clarity, the plates 53, 54, 55, 61 and 62 are shown in cross-section. Each of the plates is in the form of a spherical section and thus a small distance between the plate and the sphere may be maintained for good accuracy purposes.

Figure 7:
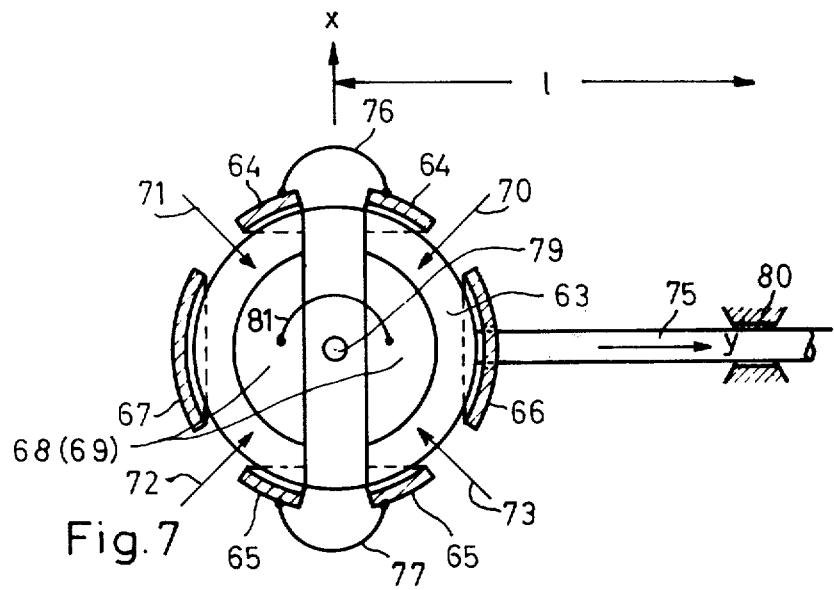
FIG. 7 illustrates an embodiment wherein a microscope stage is supported by a single cylindrical bearing and having a shaft and auxiliary bearing.
Figure 8:
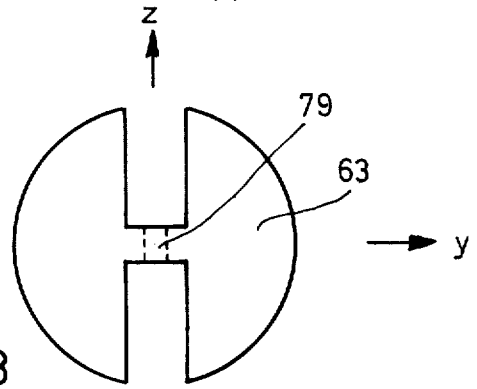
FIG. 8 is a elevation view of the cylindrical bearing of FIG. 7.

FIG. 7 illustrates a further embodiment of the invention wherein the object or specimen to be observed is supported in a single spherical bearing. A single sphere 63 provides the bearing upon which rotation takes place, the one plate of all the capacitive measuring devices and also the means for holding the object. The sphere 63 is supported by four point supports shown schematically by arrows 70 through 73 for rotation about the axis designated Y. A shaft 75 is attached to the sphere 63 and supported by a counter bearing 80 to prevent motion other than about the shaft axis. As will be described below, this bearing need not have particularly high accuracy. Electrodes 64 and 65 are provided for capacity measurement in the X direction, electrodes 68 and 69 for measurement in the Z direction and electrodes 66 and 67 for measurement in the Y direction. A center hole 79 is provided into which the object to be observed may be placed. This requires that the electrodes 64, 65, 68 and 69 be split as shown to allow viewing the object. They are however, as shown, electrically connected by wires 76, 77 and 81 respectively. The spherical body 63 contains two milling cuts to permit placing the specimen in the center of the sphere. This is better illustrated by the view of FIG. 8 which is an elevation view in the X direction of the sphere 63 of FIG. 7. This further points out why the electrodes must be split since otherwise they would be placed over an open space where no electrode surface was present. The primary advantage in the embodiment of FIG. 7 is the reduction of the number of components. Not only are bearings eliminated, but the number of capacitors and therefore the number of reference values which must be stored is cut in half over that required by the previous embodiments.

With the sphere alone, movement in any rotational direction would be possible. This is eliminated by bringing the drive shaft 75 through a hole in the electrode 66. Such an arrangement avoids any significant motion other than that of the type desired. An example of the type of accuracy required in the bearing 80 to avoid tilting motion which is unacceptable is given below. If, for example, the distance of the counter bearing 80 from the center of the sphere is 1 and the accuracy of the counter bearing 80 is $\epsilon$, then the angular error is $\epsilon$ divided by 1. With $\epsilon$ equal to 10 microns and 1 equal to 10 centimeters, a tilting error of less than 0.01° results. Another advantage of the embodiment of FIG. 7 is the small influence of thermal expansion which comes about because of the compact design. The control devices used to provide an output to the positioning members in response to the measured and reference values can be of conventional design. That is they may comprise elements such as summing amplifiers, comparators, analog to digital and digital to analog converters and other elements normally found in closed loop systems of this nature. As already noted, one of the advantages of the present system is that the hysteresis of the electrostrictive and magnetostrictive displacement elements will have no effect. In most of the practical applications of the present invention, relatively slow control devices may be used since normally only slow changes of tilt angle are required. For example, such slow movement is acceptable in tilting devices used in three dimensional electron microscopy. The need for a memory to store the reference values corresponding to each tilt angle should again be mentioned. As described above a digital memory which receives inputs from analog to digital converters is desirable. Also as mentioned above, it is preferable to measure the ratio of the opposite capacitors and thus a capacitance bridge capable of determining such a ratio should be provided and the output of that bridge then used as the input to the analog to digital converters.

In addition, it should further be noted, that the electronically compensated bearings of the present invention do not have an axis which is strictly defined. Actually, the axis can be placed within certain limits thereby permitting the axis of rotation to be located at different points of a specimen being observed in an electron microscope. This results from the fact that the mechanical bearing inaccuracy is generally very much larger than the virtual accuracy obtainable electronically. Thus, it is clear that the axis of rotation can be displaced virtually anywhere within the gap width of the capacitors. For any virtual axis position, once a set of desired set point values is obtained that axis can be repeated. However, if this capability is to be provided, separate sets of set point reference values must be provided for each axis of rotation. This, of course, will require a memory which is further enlarged to take care of the extra sets of values. Alternatively, a small general purpose digital computer may be used. With such an arrangement it is possible to shift the axis of rotation within a range of microns assuming the capacitors are provided with sufficient gaps. This is of particular value in electron microscope applications since with this capability the specimen need not be adjusted to fall right on the tilt axis. It is only necessary that the specimen be brought into the vicinity of the tilt axis with subsequent adjustment carried out electronically to any required accuracy.

Thus an improved system for providing high accuracy in the rotational axis in the tilting device of an electronic microscope or the like has been shown. Although specific embodiments have been illustrated and described, it will be obvious to those skilled in the art that various modifications may be made without departing from the spirit of the invention which is intended to be limited solely by the appended claims.

What is claimed is:

1. In a charged particle beam optical apparatus, the combination comprising:

a frame;

at least one support bearing mounted in said frame;

a tilting device, including an elongated shaft rotatably mounted in said bearing for supporting a specimen and rotating said specimen about a specified axis of rotation;

means, disposed adjacent and coupled to said tilting device, for measuring linear movement of said tilting device in at least one direction with respect to said beam;

means, coupled to said frame, for movably supporting said tilting device for movement in at least said one direction; and means, coupled to said measuring means and said support means, for determining the position of said tilting device and axis of rotation and adjusting the position thereof by means of said support means with respect to said particle beam.

2. The combination recited in claim 1, wherein said measuring means comprises a capacitive length measuring device including cylindrical members disposed on the ends of said shaft and a plurality of plate electrodes disposed adjacent and spaced apart from said cylindrical members, said plates and said members in conjunction forming a plurality of capacitors adjacent the ends of said shaft for measuring the movement thereof.

3. The combination recited in claim 1, wherein said measuring means comprises an optical length measuring device.

4. The combination recited in claim 1, wherein said means for supporting comprise a plurality of piezoelectric displacement devices.

5. The combination recited in claim 1, wherein said means for supporting comprise magnetostrictive displacement devices.

6. The combination recited in claim 1, wherein said means for supporting comprise elastically deformable support elements.

7. The combination recited in claim 2, wherein said bearing comprises a spherical bearing and additionally comprises at least one of said plate electrodes of said capacitive length measuring device.

* * * * *